(12) United States Patent
Pöllny

(10) Patent No.: US 11,181,901 B2
(45) Date of Patent: Nov. 23, 2021

(54) METHOD FOR EXECUTING AN AUTONOMOUS DRIVING OPERATION OF A VEHICLE

(71) Applicant: DAIMLER AG, Stuttgart (DE)

(72) Inventor: Oliver Pöllny, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 230 days.

(21) Appl. No.: 16/625,113

(22) PCT Filed: Jun. 11, 2018

(86) PCT No.: PCT/EP2018/065377
§ 371 (c)(1),
(2) Date: Dec. 20, 2019

(87) PCT Pub. No.: WO2019/025064
PCT Pub. Date: Feb. 7, 2019

(65) Prior Publication Data
US 2020/0142393 A1    May 7, 2020

(30) Foreign Application Priority Data

Jul. 29, 2017 (DE) .................... 10 2017 007 215.9

(51) Int. Cl.
*G05D 1/00* (2006.01)
*B60W 30/06* (2006.01)
*G06K 9/00* (2006.01)

(52) U.S. Cl.
CPC .......... *G05D 1/0011* (2013.01); *B60W 30/06* (2013.01); *G06K 9/00838* (2013.01); *G06K 9/00845* (2013.01); *B60W 2420/42* (2013.01)

(58) Field of Classification Search
None
See application file for complete search history.

(56) References Cited

U.S. PATENT DOCUMENTS 8,948,957 B2 * 2/2015 Leinfelder ........... G05D 1/0231
                                                    701/28
10,002,525 B2   6/2018 Scheerle et al.
10,710,577 B2 * 7/2020 Stefan .................. B60W 30/06

FOREIGN PATENT DOCUMENTS

DE    102012006966 A1    11/2012
DE    102013010819 A1    12/2014

OTHER PUBLICATIONS

International Search Report dated Sep. 11, 2018 in related/corresponding International Application No. PCT/EP2018/065377.
Written Opinion dated Sep. 11, 2018 in related/corresponding International Application No. PCT/EP2018/065377.

* cited by examiner

*Primary Examiner* — Todd Melton
(74) *Attorney, Agent, or Firm* — Patent Portfolio Builders PLLC

(57) ABSTRACT

A method for carrying out an autonomous driving procedure of a vehicle involves detecting a driver of the vehicle using a camera directed into the interior space of the vehicle. The driver is detected during and after leaving the interior of the vehicle using at least one further camera. A viewing direction of the driver is determined using data detected by the at least one further camera. The autonomous driving procedure is only activated when it is detected that the driver is looking at the vehicle.

11 Claims, 1 Drawing Sheet

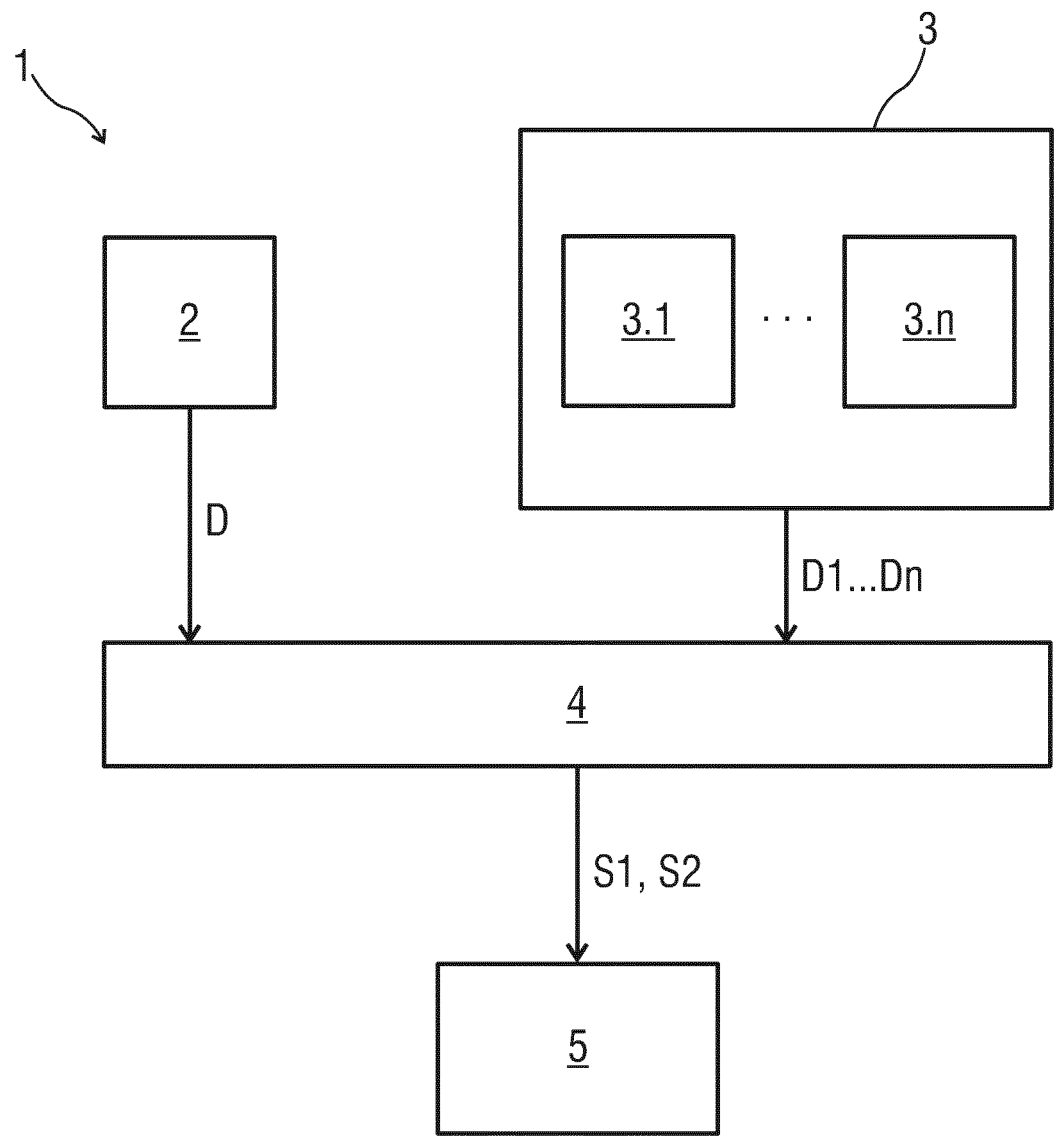

METHOD FOR EXECUTING AN AUTONOMOUS DRIVING OPERATION OF A VEHICLE

BACKGROUND AND SUMMARY OF THE INVENTION

Exemplary embodiments of the invention relate to a method for carrying out an autonomous driving procedure of a vehicle.

DE 10 2013 010 819 A1 discloses a method for the remote control of an autonomous driving procedure of a vehicle in which a signal of the vehicle is detected by means of a signal receiving unit integrated into the mobile control unit. An optical or acoustic signal is generated at a predetermined position on the vehicle, wherein remote control is only enabled if the optical or acoustic signal is detected by the signal receiving unit. Here, the control unit can be used as a so-called dead man's switch.

Exemplary embodiments of the invention are directed to an improved method, in comparison to prior art, for carrying out an autonomous driving procedure of a vehicle.

In the method for carrying out an autonomous driving procedure of a vehicle, a driver of the vehicle in a driving seat is, according to the invention, detected by means of at least one camera directed into the interior space of a vehicle. During and after leaving the interior space of the vehicle, the driver is detected by at least one further camera, wherein a viewing direction of the driver is ascertained by means of data detected by means of the at least one further camera. Carrying out the autonomous driving procedure is then only enabled if it is detected that the driver is directing their view towards the vehicle.

The method makes it possible to reliably detect an observation by the driver of the autonomous driving procedure carried out without the driver using an additional mobile device. Here, the observation is deemed to exist as long as it is unambiguously detected that the driver is looking at the vehicle. In doing so, because of the fact that an active confirmation of the observation by the driver is not necessary, on one hand, the comfort of the driver can be improved and, on the other hand, a fluid transition between driving procedures with driver presence in the interior space of the vehicle and driving processes with driver presence in the vehicle surroundings can be obtained.

Exemplary embodiments of the invention are illustrated in greater detail below by means of a drawing.

BRIEF DESCRIPTION OF THE DRAWING FIGURE

Here are shown:

FIG. 1 schematically, a block wiring diagram of a device for carrying out an autonomous driving procedure of a vehicle.

DETAILED DESCRIPTION

A possible exemplary embodiment of a device 1 for carrying out an autonomous driving procedure of a vehicle is depicted in the single FIG. 1. The vehicle is designed to carry out an autonomous driving procedure, for example an autonomous parking procedure, wherein a driver of the vehicle 1 is located outside the vehicle during the autonomous driving procedure.

In order to ensure that the autonomous driving procedure is monitored by a person and can be aborted in the event of a malfunction, carrying out the autonomous driving procedure is only enabled if it is detected that the driver is looking at the vehicle.

To do so, the device 1 comprises a camera 2, in particular arranged in the interior space of a vehicle and designed to observe a driver, and a camera system 3 having further cameras 3.1 to 3.$n$ for detecting the surroundings of the vehicle. The cameras 2, 3.1 to 3.$n$ are automatically activated, wherein the activation takes place, in particular, when the driver ends a journey. This is ascertained, for example, by detecting a deactivation of the ignition, by detecting when the car is put into the parking gear "P" and/or actuating a handbrake.

First, the driver of the vehicle in the driving seat is detected by means of the camera 2 after ending the journey. Then, the driver is detected during and after leaving the interior space of the vehicle by means of at least one further camera 3.1 to 3.$n$ of the camera system 3, wherein the data D, D1 to Dn detected by means of the camera 2, 3.1 to 3.$n$ is transmitted to an evaluation unit 4. In doing so, an uninterrupted detection of the driver and, subsequently, an identification of them in the surroundings of the vehicle can be ensured.

A viewing direction of the driver is ascertained by means of data D1 to Dn detected by means of the at least one further camera 3.1 to 3.$n$. For this purpose, the evaluation unit 4 runs an algorithm, which detects eyes of the driver and records the eye movement of the driver.

If it is ascertained that the driver is looking at the vehicle, a corresponding control signal S1 is generated by the evaluation unit 4 and is sent to a control unit 5, which controls the autonomous driving procedure. Carrying out the autonomous driving procedure is only enabled by means of the control signal S1 if it is detected that the driver is looking at the vehicle.

If it is detected that the driver is looking away from the vehicle, carrying out the autonomous driving procedure is interrupted by the evaluation unit 4 sending a further corresponding control signal 2 to the control unit 5.

No further activity by the driver is necessary for a mere confirmation of presence and observation since it is established whether the driver is observing the vehicle.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for performing an autonomous driving procedure of a vehicle, the method comprising:
   detecting, by at least one camera directed into an interior space of the vehicle, that a driver of the vehicle is in a driving seat of the vehicle;

detecting, by at least one additional camera, the driver during and after leaving the interior space of the vehicle;

determining, using data from the at least one additional camera, a viewing direction of the driver when the driver is outside of the vehicle; and performing the autonomous driving procedure of the vehicle only when it is determined that the driver is looking at the vehicle.

2. The method of claim 1, further comprising:

determining, while performing the autonomous driving procedure, that the driver is not looking at the vehicle; and interrupting the autonomous driving procedure responsive to the determination that the driver is not looking at the vehicle.

3. The method of claim 1, wherein an eye movement of the driver is detected to determine the viewing direction of the driver.

4. The method of claim 1, wherein the at least one camera and the at least one additional camera are automatically activated at an end of a journey of the vehicle.

5. The method of claim 1, wherein the autonomous driving procedure is an autonomous parking procedure of the vehicle.

6. The method of claim 1, wherein the autonomous driving procedure is performed without the driver using a mobile device.

7. A method for performing an autonomous driving procedure of a vehicle, the method comprising:

detecting, by first camera directed into an interior space of the vehicle, that a driver of the vehicle is in a driving seat of the vehicle;

detecting, by a second camera and subsequent to the detection that the driver of the vehicle is in the driving seat of the vehicle, the driver after the driver leaves the interior space of the vehicle;

determining, using data from the second camera, a viewing direction of the driver when the driver is outside of the vehicle;

initiating the autonomous driving procedure responsive a determination that the viewing direction of the driver is towards the vehicle;

determining, while the autonomous driving procedure is being performed, the viewing direction of the driver; and terminating the autonomous driving procedure when it is determined that the viewing direction of the driver is away from the vehicle.

8. The method of claim 7, wherein an eye movement of the driver is detected to determine the viewing direction of the driver.

9. The method of claim 7, wherein the first and second cameras are automatically activated at an end of a journey of the vehicle.

10. The method of claim 7, wherein the autonomous driving procedure is an autonomous parking procedure of the vehicle.

11. The method of claim 7, wherein the autonomous driving procedure is performed without the driver using a mobile device.

\* \* \* \* \*